United States Patent Office 3,335,016
Patented Aug. 8, 1967

3,335,016
NON-CAKING CURING SALT COMPOSITION FOR MEAT AND METHODS FOR MAKING SAME
Louis Sair, Evergreen Park, and Carroll L. Griffith, Hinsdale, Ill., assignors to The Griffith Laboratories, Inc., Chicago, Ill., a corporation of Illinois
No Drawing. Filed Sept. 2, 1966, Ser. No. 576,862
7 Claims. (Cl. 99—222)

ABSTRACT OF THE DISCLOSURE

A free-flowing, non-caking curing salt composition, suitable for use in curing meat products, in the form of granules of uniform chemical composition for different size gradations.

A method for making free-flowing, non-caking, chemically uniform curing salt compositions involving controlling the water (e.g., moisture) content of a composition having a major proportion of sodium chloride crystals and a minor, curing proportion of curing salt, followed by subjecting said composition to forming by compaction with pressure sufficient to cause compaction but less than that pressure which would cause any substantial exudation of dissolved curing salt during compacting. The composition is granulated, and at least one dimension of the composition is limited, before drying, to avoid any substantial migration of dissolved curing salt during subsequent drying. The composition is dried without occurrence of substantial migration of any dissolved curing salt. Granulation may occur, for example, during compacting and/or after (e.g., comminution) drying.

---

This application is a continuation-in-part of our copending application Ser. No. 406,978, filed Oct. 28, 1964, which is a continuation of application Ser. No. 342,839, filed Feb. 12, 1964, now Reissue Patent 25,996, which, in turn, is a continuation-in-part of application Ser. No. 154,363, filed Nov. 12, 1961, now abandoned.

This invention relates to new and unobvious non-caking curing salt compositions comprising sodium chloride crystals and alkali metal nitrite and/or alkali metal nitrate, and having substantially uniform composition in all size gradations, and methods of making such compositions.

Since ancient times, sodium chloride has been used to preserve meat without refrigeration.

Later, it was found that meat cured with sodium nitrate and/or sodium nitrite (hereinafter sometimes referred to as "nitrogen-containing curing salt" or "curing salt") produced a product having a desirable, relatively stable pink or red color. The nitrate or nitrite is reduced to nitric oxide which combines with the hemoglobin in meat to form the desired pink nitrosohemoglobin. When only nitrates are used, effective curing was dependent upon the bacterial reduction of the nitrate to the nitrite form, and later decomposition of nitrous acid under acid reducing conditions to provide nitric oxides. Since it became apparent that the nitrate yielded nitrite, it is now common practice to include sodium nitrite with sodium nitrate.

The meat processing industry to a large extent is accustomed to purchasing its curing salt compositions in dry salt form either for dissolution in water for pickling brines, or for direct application to whole meat products, or for admixture into ground meat products for the production of loaf and encased products. In general, such compositions include sodium chloride and nitrogen-containing curing salt selected from the group consisting of alkali metal nitrite, alkali metal nitrate, and suitable admixtures thereof.

The use of nitrates and/or nitrites in curing meat products, however, is regulated by law because harmful physiological effects may result from the unintentional or accidental use of excess amounts of these materials.

The meat processing industry wants to use the maximum amount of nitrite that is allowed by law in order to get effective curing. There are restrictions, however, which limit the maximum amount of nitrite that can be lawfully used in curing comminuted meat such as sausage, and require that the curing composition have substantially a uniform nitrite content and properly comply with the nitrite content designated on the label.

Prior to our discovery, curing salt compositions were known which comprised mechanical mixtures having a major proportion of sodium chloride and a minor proportion of sodium nitrate and sodium nitrite. One or more of the ingredients of these curing salt compositions were subject to separation in packing, shipping and handling, producing a non-uniform or non-homogeneous product. This separation problem left the meat processor in the dark as to the amount of nitrite and nitrate, presented problems concerning the amount of nitrite shown on labels for the products, and resulted in complaints by users and Government, and the return of such products to the manufacturer.

To obviate or overcome this separation, a flash-dried composition was made, such as disclosed in Patent 2,054,624, wherein the nitrate and/or nitrite were dissolved in a sodium chloride solution and the resulting solution was spread on hot rotating rolls. The water rapidly evaporated and the flash-dried product was scraped from the rolls to produce crystals that were smaller or finer than the physical mixture described above. Many of the resulting sodium chloride crystals were essentially single crystals of cubic shape. The flash-dried composition contained at least about 80% by weight of sodium chloride and not more than about 20% of a nitrogen-containing salt selected from the group consisting of alkali metal nitrite, alkali metal nitrate, or admixtures thereof. One such flash-dried composition had, for example, about 90 parts by weight of sodium chloride, about 4 parts by weight of sodium nitrate and about 6 parts by weight of sodium nitrite, and about 0.5% by weight moisture content. This composition had a particle size distribution on U.S. Bureau of Standards screens such as exemplified by the following:

| | Percent |
|---|---|
| Retained on 100 mesh screen | 2 |
| Retained on 200 mesh screen | 47 |
| Passed through a 200 mesh screen | 51 |

Although the flash-dried composition obviated or overcame the serious problem of non-uniformity inherent in the physical mixture of the individual ingredients, it exhibited a great tendency to cake.

The problems confronting the art were essentially twofold:

(1) It was essential that the proportion of nitrogen-containing curing salt be substantially the same in different granule size gradations and in different sampled portions of the curing salt composition, so that Federal requirements as to chemical uniformity of the composition could be followed (e.g., the Meat Inspection Division of the U.S. Department of Agriculture, for example, now permits the amount of nitrite to vary plus or minus 10% by weight where there is more than 2% by weight nitrite, and the nitrite to vary plus or minus 15% by weight when less than 2% by weight theoretical nitrite is used).

(2) The granular product must be free-flowing and not cake or agglomerate into large adherent masses under normal storage conditions.

Patent 2,054,624 solved the first problem but did not solve the second one.

We discovered that both problems are overcome by using the following controls:

(a) The granules of the curing salt composition of uniform nitrite content must be sufficiently irregular in shape to maintain substantially no face-to-face contact of extended surfaces of the particles, whereby caking is avoided under normal storage conditions;

(b) By forming, with the utilization of compaction, the curing salt composition of (a) above, from: (i) sodium chloride crystals having the nitrogen-containing curing salt positioned on and/or in said sodium chloride crystals, and/or (ii) a physical mixture of sodium chloride crystals and nitrogen-containing curing salt. One may subject, for example, either a flash-dried composition of uniform chemical composition, such as shown in Patent 2,054,624, or a composition comprising a mechanical mixture of the sodium chloride and nitrogen-containing curing salt, to compaction forces;

(c) By controlling the amount of water (e.g., moisture) present during compaction, so that exudation of a significant amount of dissolved curing salt is obviated during compaction. If drying is required after compaction, at least one dimension of the compacted composition should be limited, so as to obviate significant migration of curing salt solution during drying.

The granular non-caking curing salt compositions of our invention are suitable for use as a curing salt for meat, and the granules are sufficiently sturdy to withstand normal handling without disintegration. The compositions include a major proportion (e.g., at least about 80% by weight) of sodium chloride and curing proportion (e.g., not more than about 20% by weight) of curing salt, are free of significant quantities of migrated curing salts, have substantial uniformity of chemical composition in all size gradations, and are formed by compaction so that the granules, which are composed of bonded sodium chloride crystals and curing salt are sufficiently irregular to maintain substantially no face-to-face contact of extended surfaces of said granules during normal storage conditions and thereby avoid caking in normal use.

These granules of non-caking curing salt composition are made, for example, by taking fine-grained, particulate flash-dried composition having uniform chemical composition or substantially uniform physical admixture of sodium chloride and curing salt, and compacting the composition in the presence of substantially no water (e.g., moisture) or not more than a minor amount of water, thereby obviating the exudation of substantial dissolved curing salt from the crystals during compaction, which exudation tends to produce a composition having non-uniform chemical content.

After the flash-dried composition is subjected to compaction, there may be no need later to subject the compacted product to granulation (e.g., comminution), provided the compacted product comprises free-flowing discrete granules of bonded sodium chloride crystals and curing salt, and the granules are sufficiently irregular to maintain substantially no face-to-face contact of extended surfaces of the granules with each other, whereby the non-caking granular composition has uniform chemical content in different size gradations.

When a mechanical mixture of sodium chloride and curing salt is used, the granular non-caking salt composition may be formed, for example, by subjecting the sodium chloride crystals and curing salt, together, to compaction in the presence of substantially no water (e.g., moisture) or not more than a minor amount of water, so as to obviate substantial exudation of dissolved curing salt during compaction, and to granulation to produce granules having less than 2% by weight of water. The discrete granules, comprising bonded sodium chloride crystals and curing salt which are sufficiently irregular so as to maintain substantially no face-to-face contact of extended surfaces of the granules with each other. If drying is required after compaction, at least one dimension of the compacted composition should be limited so as to avoid substantial migration of the curing salt solution during drying, whereby the granules have uniform chemical content in different size gradations. In some instances, the drying operation may be conducted before the compacted composition is granulated (e.g., particulated), and in other instances the drying operation may be conducted after the composition is granulated.

The process steps and conditions are interrelated to the production of our granular non-caking curing salt compositions and must be controlled to accomplish the desired results, and a variation in the manner one step is conducted may require an adjustment in or modification of the conduct of another step or steps.

When a relatively low amount of water is present during compaction, a relatively greater amount of pressure may be exerted on the material during compaction. This urges the sodium chloride to undergo plastic flow about or with at least some of the nitrite and/or nitrate. If one increases, within controlled limits, the amount of water present during compaction, one may use a relatively lower amount of pressure. However, in view of the requisite conditions and desired results discussed above and the discussion, illustrative examples, and tests which follow, the specific details of suitable process steps or conditions, other than those specifically stated herein, can be determined within the skill of the art.

When the forming by compaction is conducted by extruding the curing salt composition with effective pressure (may be only the pressure required for forming extrudes), the extrusion step may also effect granulating of the composition to form pellets of somewhat cylindrical shapes. Such shapes are herein deemed to be irregular in form in that they obviate substantial face-to-face contact of extended surfaces of the particles.

In the particular curing salt compositions of the examples and tests which follow, at least some of the curing salt was entrapped (e.g., encapsulated) by a matrix of sodium chloride crystals that were bonded together. The amount of water present during compaction was limited, for example, to obviate the exuding of dissolved curing salt from the particles during compaction, and thereby reduce the chance of non-uniformity.

In the following illustrative Examples 1 and 2, the solution which was flash-dried had a composition (based on solids) as follows:

| | Parts by weight |
|---|---|
| Sodium chloride | 90 |
| Sodium nitrate | 4 |
| Sodium nitrite | 6 |

The percentage values in the examples are on a weight basis.

EXAMPLE 1

Crystals are removed from the flash-drying rolls at 3% moisture content and pelletized by conventional equipment, for example, to pellets about ¼-inch in length and about 3/16-inch in diameter. These are dried to 0.1% moisture content, and then comminuted to a product as follows:

| Mesh | Percent | Percent Nitrite |
|---|---|---|
| On 100 | 62 | 6.06 |
| On 200 | 34 | 6.10 |
| Thru 200 | 5 | 6.03 |

EXAMPLE 2

Crystals are removed from the flash-drying rolls at 1.5% moisture content. A mass thereof is forced through caking compression rolls exerting a force of 60,000 pounds per linear inch of roll, forming a cake ⅛-inch thick.

The cake is broken into lumps and dried to 0.1% moisture content and comminuted to a uniform product as follows:

| Screen Mesh Size | Percent of Composition | Percent Nitrite |
|---|---|---|
| On 100 | 65 | 6.03 |
| On 200 | 33 | 6.05 |
| Thru 200 | 2 | 6.02 |

The non-caking characteristic of the product has been demonstrated by shipping it in drums around the country for three months, and at the same time similarly shipping the prior commercial form as controls. The drums used were 7-ply fiber drums with lacquered metal lids and bottoms.

As shown in Reissue Patent 25,996, a composition by weight of 90 parts of sodium chloride crystals, 6 parts of sodium nitrite crystals and 4 parts of sodium nitrate crystals was ground fine, presenting a screen analysis as follows:

TABLE I

| Fraction | Fine Mixture | |
|---|---|---|
| | Percent of whole | Percent Nitrite |
| On 150 Mesh | 1 | 5.85 |
| On 200 Mesh | 10 | 6.65 |
| On 270 Mesh | 22 | 6.15 |
| Thru 270 Mesh | 66 | 6.05 |

Portions of the fine-grained mass with and without added water are compacted between rolls by a force of 5,400 pounds per linear inch of roll, followed, if necessary, by drying, and then the resulting caked forms are reduced in size and the resulting mass subjected to screen analysis and to the determination of the nitrite content in the fractions so obtained.

Table II shows the percent of water added to the original mass to be subjected to compaction, the mesh screens used, the screen analysis and the nitrite content in percent by weight in each screen fraction.

We prefer that our uniform, compacted flash-dried curing salt composition have a particle size distribution, for example, as follows:

TABLE III

| | Percent by weight |
|---|---|
| On 12 mesh screen (max.) | 1 |
| On 16 mesh screen | 4–11 |
| On 20 mesh screen | 20–39 |
| On 50 mesh screen (min.) | 98 |
| Fines through 50 mesh screen (max.) | 2 |

The compositions referred to in Table III, above, have superior non-caking properties under adverse storage conditions.

The following tests were conducted to illustrate varied process conditions.

Test 1

An admixture was prepared from the following separate materials:

| | Weight |
|---|---|
| Sodium chloride (200 mesh) | 42 lbs. 12 ozs. |
| Sodium nitrite | [1] 6 lbs. 4 ozs. |
| Sodium nitrate | 1 lb. |
| Water | 5 lbs. 9 ozs. |

[1] 12.5% by weight nitrite based on weight of total solids.

The aqueous mixture of nitrite, nitrate and water was heated to about 170–1-80° F., and, while hot, was mixed with sodium chloride for about 15 minutes to form a composition having a consistency similar to a viscous putty. Separate sets of samples were prepared from the mix.

One set of samples was formed by (a) pressing a portion of the mix through a 7/64-inch wire screen with a trowel, (b) pressing a portion of the mix through a potato ricer having a 9/64-inch perforate screen, (c) gently grinding another portion of the mix in a mortar with a pestle, and (d) pushing the open end of an elongated, hollow (3/16-inch diameter), cylindrical (about 1¼ inches long) metal die down into another portion of the mix, as one shapes dough with a cookie cutter, and extruding the shaped mix from the tube with a plunger rod. The samples were then placed in an oven at about 300° F. for about 30 to 45 minutes. The dried samples were gently ground in a mortar with a pestle, so that the material would pass through a 12 mesh wire screen. The screen analysis and percent by weight nitrite (based on weight

TABLE II

| Batch | Percent H₂O | | On 50 Mesh Screen | On 100 Mesh Screen | On 200 Mesh Screen | Thru 200 Mesh Screen |
|---|---|---|---|---|---|---|
| A | 0 | Percent of Composition | 54 | 28 | 5 | 13 |
| | | Percent Nitrite | 6.10 | 5.99 | 6.05 | 6.05 |
| B | 1 | Percent of Composition | 61 | 24 | 4 | 10 |
| | | Percent Nitrite | 6.05 | 6.06 | 5.95 | 5.95 |
| C | 2 | Percent of Composition | 55 | 24 | 7 | 14 |
| | | Percent Nitrite | 6.06 | 5.98 | 6.05 | 6.05 |
| D | 4 | Percent of Composition | 57 | 23 | 7 | 13 |
| | | Percent Nitrite | 6.03 | 5.99 | 6.04 | 6.02 | of total solids) of the resulting samples are shown in Table A below:

TABLE A

| Treatment | Particle Size | | | |
|---|---|---|---|---|
| | On 16 Mesh Screen | On 20 Mesh Screen | On 50 Mesh Screen | Through 50 Mesh Screen |
| (a) Pressed Through Screen with Trowel, Dried, and Ground: | | | | |
| Percent of Composition | 39 | 22 | 19 | 20 |
| Percent Nitrite | 12.2 | 12.2 | 12.0 | 12.4 |
| (b) Pressed Through Potato Ricer, Dried, and Ground: | | | | |
| Percent of Composition | 42 | 24 | 19 | 15 |
| Percent Nitrite | 11.8 | 11.9 | 12.5 | 12.5 |
| (c) Ground, Pressed Through Potato Ricer, Dried, and Ground: | | | | |
| Percent of Composition | 46 | 27 | 11 | 16 |
| Percent Nitrite | 12.0 | 12.2 | 12.6 | 12.6 |
| (d) Pellets Extruded from Die, Dried, and Ground: | | | | |
| Percent of Composition | 30 | 20 | 24 | 26 |
| Percent Nitrite | 12.3 | 12.4 | 11.8 | 11.5 |

Another set of samples was formed from the mix by (a) pressing a portion of the mix through a potato ricer having a 9/64-inch perforate screen, and (b) gently grinding another portion of the mix in a mortar with a pestle. The samples were air-dried in open pans overnight, and the drying was completed by placing the pans in an oven at about 150° F. for about 8 hours. The dried samples were gently ground in a mortar with a pestle so that the material would pass through a 12 mesh wire screen. The screen analysis and percent by weight nitrite (based on weight of total solids) of the resulting samples are shown in Table B, below:

TABLE B

| Treatment | Particle Size | | | |
|---|---|---|---|---|
| | On 16 Mesh Screen | On 20 Mesh Screen | On 50 Mesh Screen | Through 50 Mesh Screen |
| (a) Pressed Through Potato Ricer, Dried, and Ground: | | | | |
| Percent of Composition | 40 | 20 | 21 | 19 |
| Percent Nitrite | 12.2 | 12.5 | 13.4 | 12.8 |
| (b) Ground, Pressed Through Potato Ricer, Dried, and Ground: | | | | |
| Percent of Composition | 31 | 25 | 26 | 18 |
| Percent Nitrite | 12.0 | 12.2 | 12.6 | 11.7 |

The curing salt compositions shown in Tables A and B, above, had uniform nitrite content.

*Test 2*

An admixture was prepared from the following materials that were blended as described below:

Weight, grams
Sodium chloride (200 mesh) _____ 342
Sodium nitrite (200 mesh) _____ ¹ 50
Sodium nitrate (200 mesh) _____ 8
Water _____ 44.4

¹ 12.5% by weight nitrite based on weight of total solids.

A group of samples of the above composition was prepared by (a) pre-dissolving the nitrite and nitrate in water and maintaining the resulting solution at a temperature of about 170° F., and adding the solution to and mixing it with the sodium chloride; (b) admixing sodium chloride, nitrite and nitrate, followed by adding water at about 170° F., and blending the composition in a mortar with a pestle to produce a thick paste; and (c) the same as (b), but the water was added at room temperature.

Each of the samples was extruded from a 3/16-inch diameter, cylindrical die in accordance with the procedure of Test 1, above.

The extruded samples were dried at about 300° F. for about 1 hour, and were then gently ground in a mortar with a pestle so that the material would pass through a 12 mesh wire screen. The screen analysis and percent by weight nitrite (based on weight of total solids) of the resulting samples are shown in Table C, below:

TABLE C

| Treatment | Particle Size | | | |
|---|---|---|---|---|
| | On 16 Mesh Screen | On 20 Mesh Screen | On 50 Mesh Screen | Through 50 Mesh Screen |
| (a) Pre-Dissolving in Water and Adding Heated Solution to Sodium Chloride, Extruding, Drying, and Grinding: | | | | |
| Percent of Composition | 22 | 17 | 25 | 36 |
| Percent Nitrite | 12.26 | 12.7 | 12.6 | 11.5 |
| (b) Blending Entire Solid Mix with Hot Water, Extruding, Drying, and Grinding: | | | | |
| Percent of Composition | 26 | 17 | 23 | 34 |
| Percent Nitrite | 12.7 | 12.6 | 12.6 | 11.3 |
| (c) Blending Entire Solid Mix with Water at Room Temperature, Extruding, Drying, and Grinding: | | | | |
| Percent of Composition | 22 | 16 | 26 | 36 |
| Percent Nitrite | 12.6 | 12.6 | 12.3 | 11.5 |

The curing salt compositions shown in Table C, above, had uniform nitrite content.

*Test 3*

An admixture was prepared from the same heated composition shown in Test 1, above.

The composition was extruded from a ½-inch diameter tubular die in accordance with the procedure of Test 1, above. Little pressure was required for this extrusion. The extruded material was sliced into thin, 1/32-inch wide disks with a razor blade. The disks were dried at about 300° F. for about 1½ hours. The dried disks were gently ground in a mortar with a pestle so that the material would pass through a 12 mesh wire screen. The screen analysis and percent by weight nitrite (based on weight of total solids) of the resulting sample is shown in Table D, below:

TABLE D

| Treatment | Particle Size | | | |
|---|---|---|---|---|
| | On 16 Mesh Screen | On 20 Mesh Screen | On 50 Mesh Screen | Through 50 Mesh Screen |
| Pellets Extruded from Die and Cut Into 1/32-inch Thick Disks, Dried, and Ground: | | | | |
| Percent of Composition | 28 | 19 | 23 | 30 |
| Percent Nitrite | 12.3 | 12.5 | 13.0 | 12.6 |

The curing salt composition shown in Table D, above, had uniform nitrite content.

In the claims, which follow, reference to the curing salt being bonded or positioned "on or in" sodium chloride crystals, is intended to include the curing salt being both on and in sodium chloride crystals.

The foregoing detailed description has been given for clearness of understanding only, and no unnecessary limitations should be understood therefrom, as modifications will be obvious to those skilled in the art.

We claim:

1. The method of producing free-flowing non-caking, curing salt compositions in the form of granules suitable for use in curing meat products, said granules having uniform chemical composition in all size gradations, being sufficiently sturdy to withstand normal handling without disintegration, and having irregularity of surfaces sufficient to avoid caking in normal use, which method comprises: obtaining a substantially uniform composition consisting essentially of a major proportion of sodium chloride crystals and a minor, curing proportion of curing salt which is a member of the group consisting of alkali metal nitrites, alkali metal nitrates, and admixtures thereof; controlling the water content of said composition to effectuate subsequent compaction, to avoid substantial exudation of dissolved curing salt during said subsequent compaction, and to avoid substantial migration of dissolved curing salt during subsequent drying; compacting said composition, after said water content-controlling step, with pressure sufficient to cause effective compaction but less than that pressure which causes substantial exudation of dissolved curing salt during compacting; granulating said composition; limiting at least one dimension of said composition before the subsequent drying step to avoid substantial migration of dissolved curing salt during the subsequent drying step; and drying said composition; whereby there is provided granules composed of bonded sodium chloride crystals with curing salt positioned on or in said crystals.

2. The method of claim 1 wherein said step of limiting at least one dimension of the composition and a granulating step are performed simultaneously in one operation.

3. The method of claim 1 wherein said step of limiting at least one dimension of the composition and said compacting step are performed simultaneously in one operation.

4. The method of claim 1 wherein said step of limiting at least one dimension of the composition, said compacting step and granulating step are performed simultaneously in one operation.

5. The method of claim 1 wherein said compacting step involves compaction by extrusion.

6. The method of claim 1 wherein the composition so produced includes granules having at least some of said curing salt entrapped by a matrix of sodium chloride crystals which are bonded together.

7. A free-flowing, non-caking curing salt composition suitable for use in curing meat products, which composition is in the form of granules of uniform chemical composition in all size gradations, said granules being sufficiently sturdy to withstand normal handling without disintegration and having surfaces sufficiently irregular to avoid substantial face-to-face contact with other granules, said composition produced by the method of claim 1.

References Cited

UNITED STATES PATENTS

| Re. 25,966 | 3/1966 | Sair et al. | 99—222 |
| 2,054,624 | 9/1936 | Griffith | 99—222 |
| 2,054,625 | 9/1936 | Griffith | 99—222 |
| 2,400,292 | 5/1946 | Dalton | 99—159 |

HYMAN LORD, *Primary Examiner.*

UNITED STATES PATENT OFFICE

CERTIFICATE OF CORRECTION

Patent No. 3,335,016                                          August 8, 1967

Louis Sair et al.

It is hereby certified that error appears in the above numbered patent requiring correction and that the said Letters Patent should read as corrected below.

Column 3, lines 37 and 73, after "salt", each occurrence, insert a comma; line 69, after "of" insert -- the --; same column 3, line 73, strike out "which"; column 6, line 33, for "170-1-80° F." read -- 170-180° F. --; column 7, line 59, for "nitrate" read -- nitrite --; column 8, line 70, after "free-flowing" insert a comma; column 10, line 24, for "Re. 25,966" read -- Re. 25,996 --.

Signed and sealed this 25th day of June 1968.

(SEAL)
Attest:

Edward M. Fletcher, Jr.                                  EDWARD J. BRENNER
Attesting Officer                                                 Commissioner of Patents